United States Patent [19]
Di Tuoro

[11] Patent Number: 4,727,563
[45] Date of Patent: Feb. 23, 1988

[54] COMBINED CASSETTE CARRIER AND DECONTAMINATION APPARATUS

[76] Inventor: Maurice Di Tuoro, 3, Square des Ormes, 78160 Marly le Roi, France

[21] Appl. No.: 775,290

[22] Filed: Sep. 12, 1985

[30] Foreign Application Priority Data

Sep. 12, 1984 [FR] France .................................. 84 14006

[51] Int. Cl.⁴ .............................................. G03B 42/04
[52] U.S. Cl. .................................... 378/167; 378/210; 422/187; 422/301
[58] Field of Search ................. 422/187, 309, 301; 378/167, 204, 210

[56] References Cited

U.S. PATENT DOCUMENTS

| 1,579,124 | 3/1926 | MacGrath | 422/300 |
| 2,348,574 | 5/1944 | Ross | 422/300 |
| 2,386,658 | 10/1945 | Caspersz | 378/167 |
| 3,771,781 | 11/1973 | Lackey et al. | 378/167 |
| 3,955,922 | 5/1976 | Moulthrop | 422/300 |
| 4,496,522 | 1/1985 | McConnell | 422/300 |

FOREIGN PATENT DOCUMENTS 1492393  10/1969  Fed. Rep. of Germany ...... 422/300

Primary Examiner—David L. Lacey
Attorney, Agent, or Firm—Sughrue, Mion, Zinn, Macpeak & Seas

[57] ABSTRACT

A movable apparatus for insuring the taking of X-Rays in any location and under safe aseptic conditions. A tube assembly forms a tripod for supporting an X-ray cassette. A caisson suitable for containing the tube assembly and the cassette includes, for example, a tank of decontamination material released inside the caisson after its lid is manipulated to place the cassette inside the caisson. The caisson may also include an ultraviolet lamp for providing further decontamination. This permits the taking of X-rays, directly over the patient's bed, while avoiding contamination by germ transfer.

11 Claims, 24 Drawing Figures

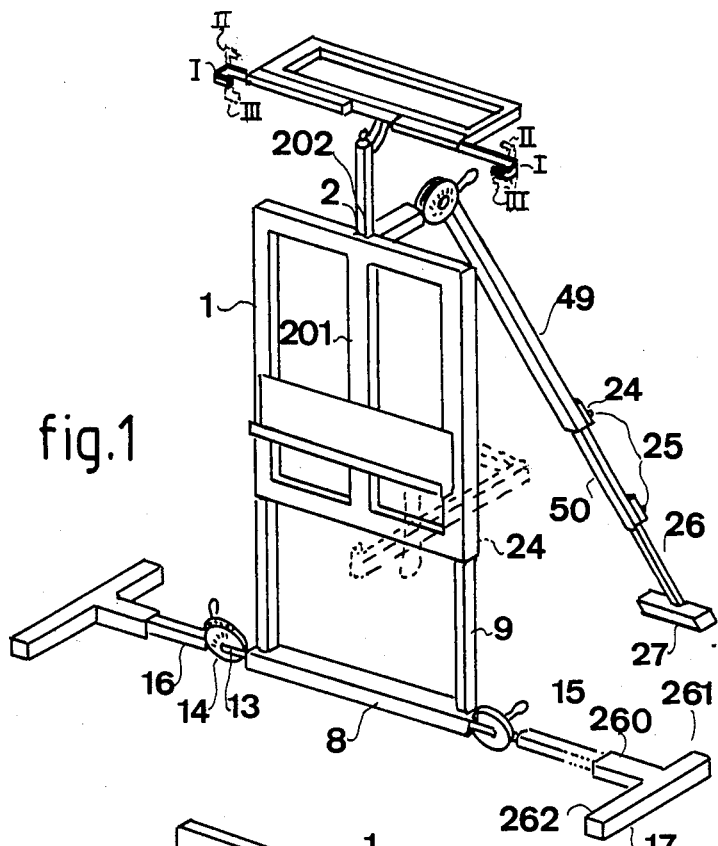
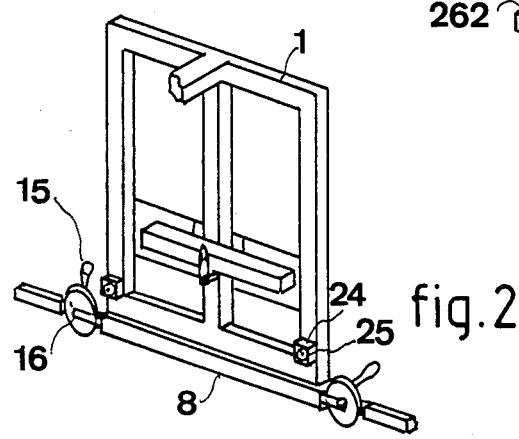

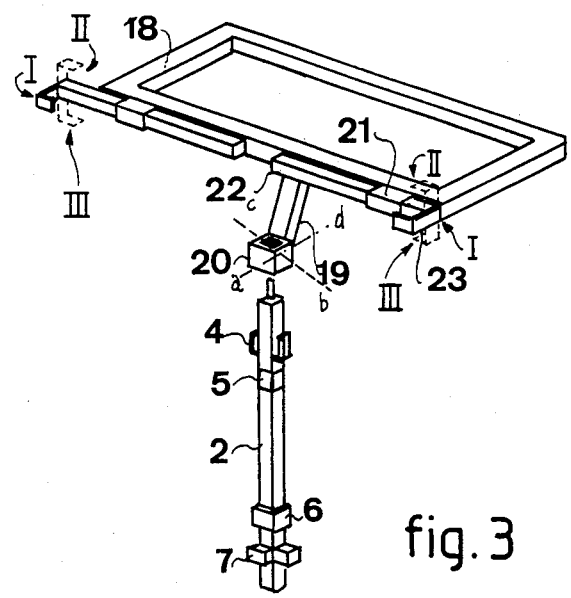
fig. 3
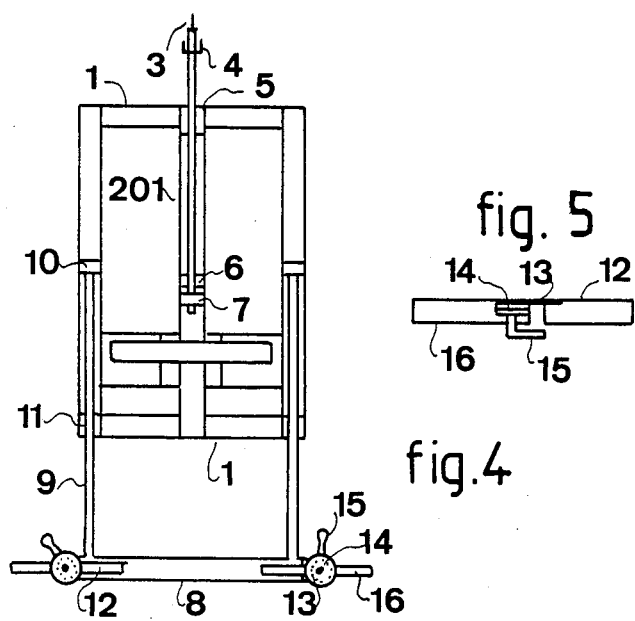
fig. 5
fig. 4

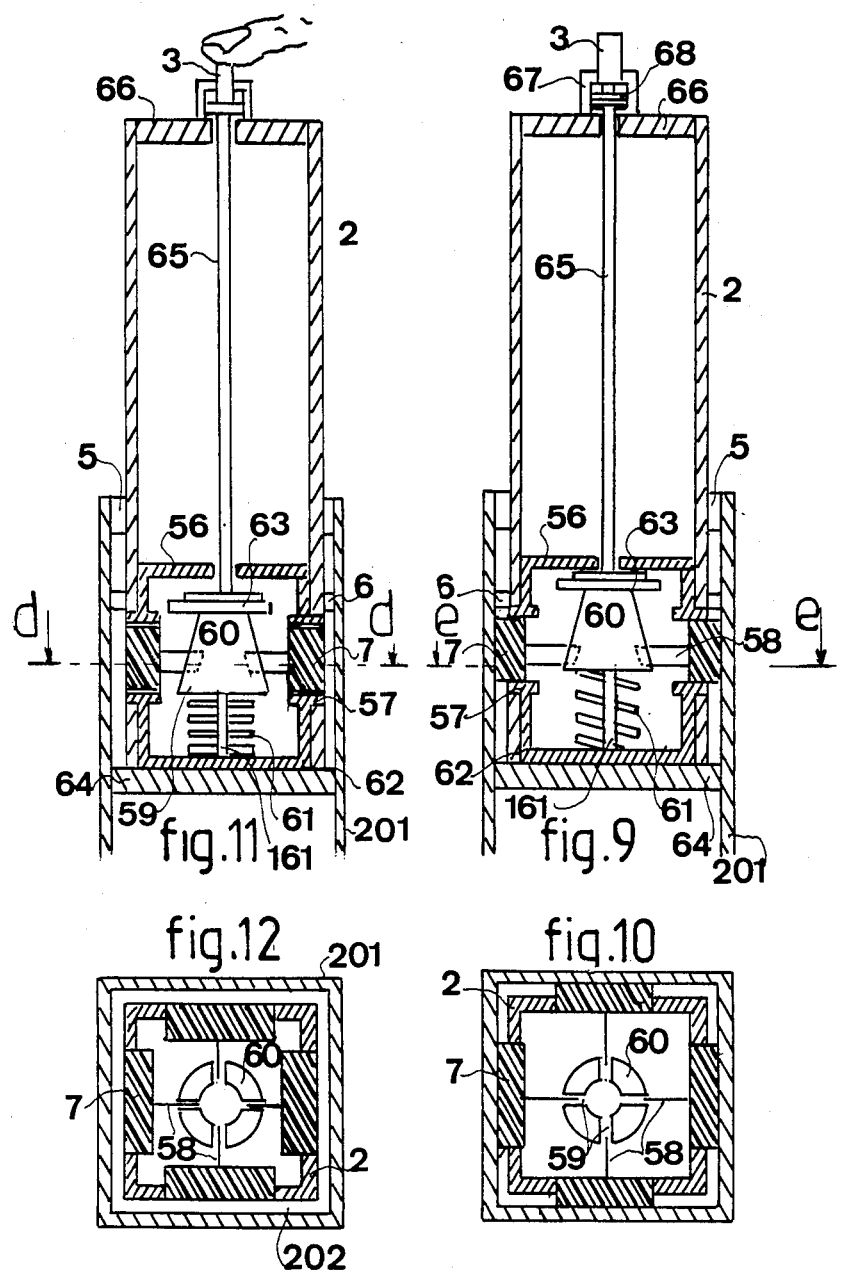

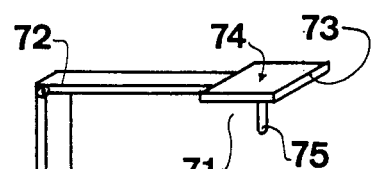
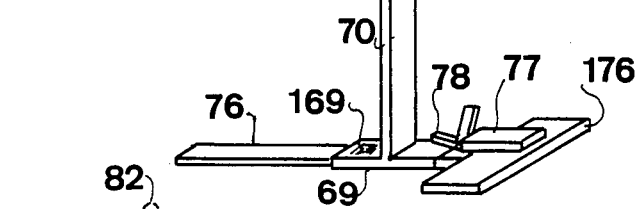
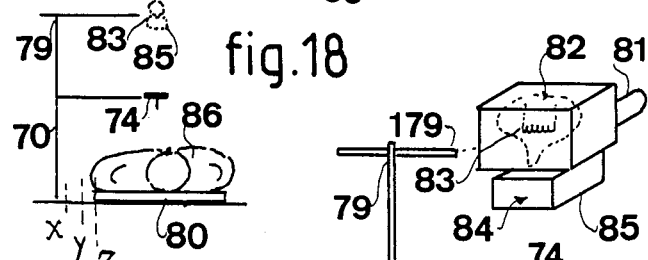
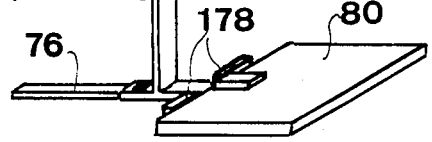
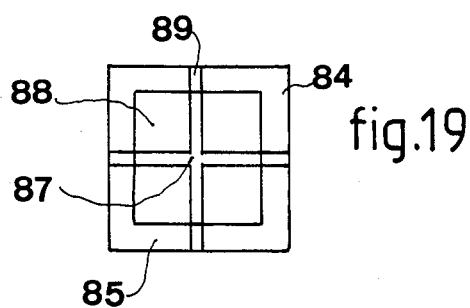

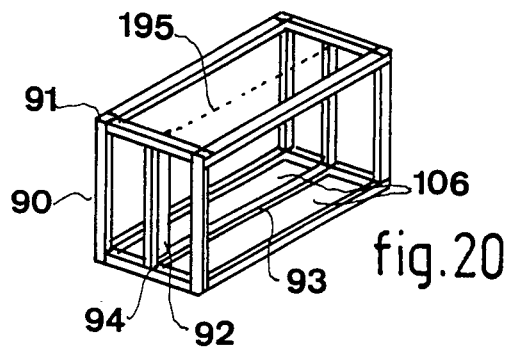
fig.20
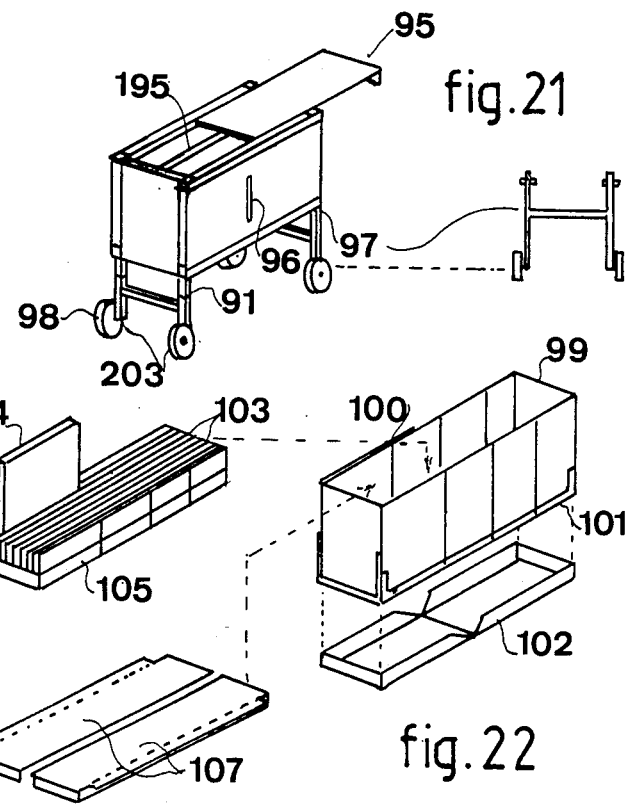
fig.21
fig.22

COMBINED CASSETTE CARRIER AND DECONTAMINATION APPARATUS

The present invention relates to movable apparatus able to act in combination with an X-ray device comprising a source of X-ray radiation and at least one X-ray cassette to be subjected to X-ray radiation in any location with complete aseptic safety, and in particular emergency X-rays at the patient's bedside, in a sterile medium, or in a radio-diagnostic room.

French patent application No. 2 534 704 already describes a cassette-carrier apparatus having a holding backplate which is balanced by horizontal stabilizers comprising: a main cassette carrier, with the assembly bearing on a T-shaped strut; a post supporting a rectangular frame and adjustable in height, being held by a pin; and a 90° L-shaped bracket including a side-mounted cassette supporting device.

This apparatus offers most advantageous new possibilities of performing radiographic work in any surroundings, but unfortunately, under some conditions it may facilitate contamination by conveying unwanted germs from one place to another.

Some germs thrive in hospital conditions, and contamination can occur from any kind of manipulation, since the germs are conveyed by the patient-treating personnel using the same equipment of different patients. An X-ray cassette which is put into direct contact with the patient to be X-rayed in bed may be enclosed in a cover, however this practice is neither widespread nor is it completely safe.

The improvements provided by the present invention provide the means of ensuring aseptic conditions when using apparatus of the type described above.

More precisely, the present invention provides movable apparatus enabling X-rays to be taken at any location and with complete aseptic safety, characterized by the fact that it comprises:

a tripod, said tripod being constituted by a plurality of first unit elements capable of being assembled to one another, and control means for locking said unit elements to one another to form said tripod;

means for fixing an X-ray cassette on said tripod;

means for positioning said tripod over a reference surface and at a given orientation;

a caisson constituted by second interfitting elements, the said caisson having inside dimensions which are determined to enclose said first elements and/or at least one of said X-ray cassettes; and controllable means for decontaminating the inside of said caisson.

Other characteristics and advantages of the present invention appear from the following description given with reference to the accompanying drawings and by way of non-limiting illustrative example; in the drawings:

FIG. 1 is an overall perspective view of one embodiment showing the new design for the tripod;

FIG. 2 is a back view in perspective with the secondary structure retracted inside the main structure;

FIG. 3 is a detail perspective view of a rectangular frame or tray shown removed from its post;

FIG. 4 is a detail section view of the main and the secondary structures;

FIG. 5 is a section view seen from above of the hinge of a T-shaped stabilizer fitted to the secondary structure;

FIG. 9 is a section view through the post showing its locking mechanism which is disposed inside the stanchion of the main structure;

FIG. 10 is a section view along line e-e of FIG. 9;

FIG. 11 shows the unlocking of the four brake shoes;

FIG. 12 is a section view along line d-d of FIG. 11;

FIG. 16 is a perspective view of a tool for adjusting radiographic parameters;

FIG. 17 is a perspective view similar to FIG. 16 showing a cassette in position relative to an X-ray source block;

FIG. 18 is a diagrammatic view showing the positioning of a gauge between the patient and the ionizing source, and also the position of the slide depending on the cassette format: x, y, or z;

FIG. 19 is a plan view of the light-centering device used in the apparatus of FIGS. 16 and 17;

FIG. 20 is a perspective view showing the framework of a decontamination caisson;

FIG. 21 is a perspective view of a caisson mounted on wheels, together with a separate view of a set of two wheels;

FIG. 22 is an elevation view of a caisson in accordance with FIGS. 20 and 21;

Figure 6:
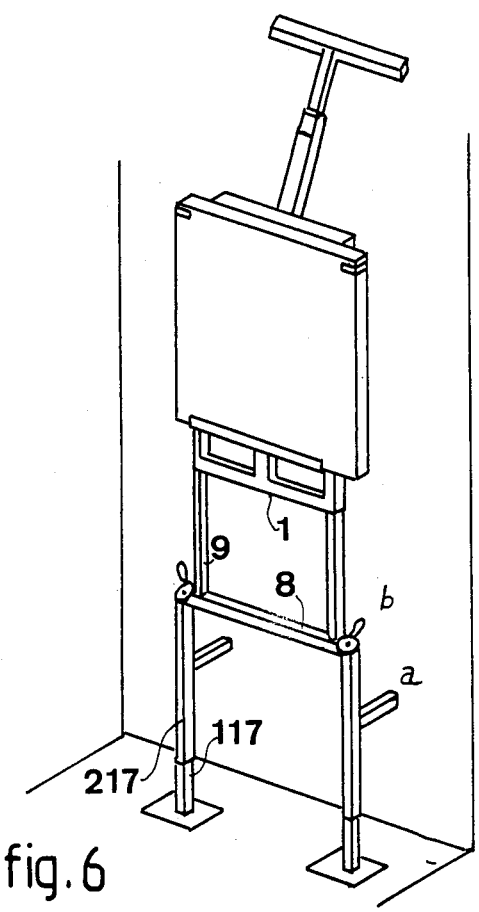
FIG. 6 is a perspective view of a wall-type cassette-carrier.

The embodiments of the apparatus as shown in the drawings comprise a main structure 1 constituted by a rectangular frame including a stanchion 201, a side-mounted cassette carrier shown in dashed lines, and a telescopic strut 49. This embodiment also includes a post 2 capable of sliding and of being locked by means of a permanent locking device, with an unlocking control using a pushbutton 3 enabling the post to slide solely while pressure is being applied.

Two brackets 4 fixed to a rod are suitable for receiving and holding the rectangular frame. A square sleeve 5 has the effect of guiding the post 2 while it slides inside the stanchion 201, with a small mechanical clearance suitable for allowing the post to slide, said sleeve being glued inside the stanchion level with the orifice 202. Another square sleeve 6 is glued to the post 2 and completes post guidance. Four locking lugs 7, which are visible in FIGS. 9, 10, 11 and 12 serve to lock the post relative to the stanchion 201.

A secondary structure or base 8 is deployed as shown in FIG. 1 and fits inside the main structure (FIG. 2). The structure 8 comprises two stanchions 9 suitable for sliding in and being locked relative to the frame of the main structure. A backplate 10 at the top of each of the stanchions 9 allows sliding to take place with little mechanical clearance inside the structure 1. A square sleeve 11 (FIG. 4) disposed inside the structure 1 and level with the orifice through which the corresponding one of the two stanchions 9 completes the guide means.

The secondary structure or base 8 has a casting 16 on either side thereof (FIG. 5). Each of these castings is riveted to the inside of the base 8 on a bar 12 which includes a flat 13 connected to a circular, toothed half-shell 14, with a second toothed half-shell being put in tooth-engaging association with the first. A handle 15 including a threaded rod suitable for locking the pairs of half-shells together serves to fix their relative positions. The castings 16 are fixed to the second half-shells.

An excentric T-shaped part 17 constitutes an additional stabilizer. It comprises, for example, three adaptor orifices 260, 261, 262 (FIG. 1). It may also receive a tube 117 mounted on a jack 217 (FIG. 6).

A rectangular frame 18 is fixed on a substantially inclined swan-neck 19 which has a square sleeve 20 at its base suitable for fixing on the post 2 along any one of orientations a, b, c, or d, with the two brackets 4 serving to receive the sleeve 20. The rectangular frame 18 includes two welded jaw guides 21 each suitable for receiving a square bar 22. Each bar is free to slide and to be locked inside the corresponding guide and has a jaw 23 at its end. Thus, each bar can take up any one of three directions I, II, III (FIG. 3), and serves to position a cassette either on the rectangular frame, or else on the structure, depending on the position of the jaws 23.

In a first variant of the invention, a permanent locking element 24 comprises a brake shoe 44 for locking the stanchions 9 inside the main structure 1 so as to fix the secondary structure 8 to the main structure 1. An example of the locking element 24 is shown in detail in FIGS. 13, 14, and 15.

Figure 13:
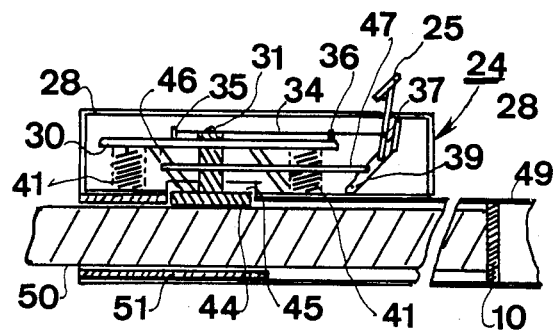
FIG. 13 is a section view showing a detail of the locking mechanism for a tube in accordance with a second variant, and including a brake shoe which is permanently tight.
Figure 14:
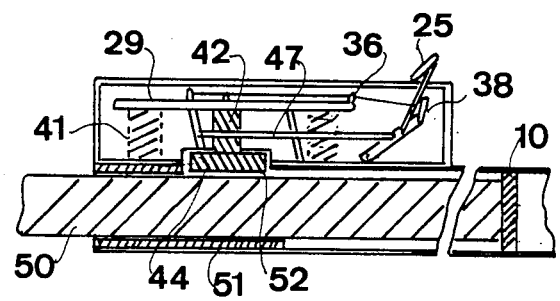
FIG. 14 is a section view of the mechanism shown in FIG. 13, showing the said brake shoe being unlocked.
Figure 15:
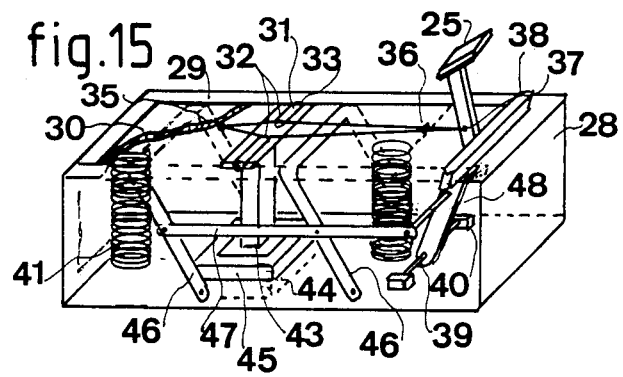
FIG. 15 is a perspective view showing the detail of the housing of FIGS. 13 and 14, and showing the mechanism in the locking position.

The element 24 is shown in its permanent locking position in FIG. 13 and in its unlocking position in FIG. 14.

The element 24 comprises (FIG. 15): a housing 28; an inwardly directed stop-constituting flange 29; a plate 30; under the center of which there is disposed a small tube 31 having a shaft 33 therein associated with a spring (not shown). A linkage constituted by a metal wire 34 (or a plastic rod) passes under a retaining eye 35. The shaft 33 is pressed under the stop 29 by means of its associated spring. The locking element 24 further includes a guide pulley 36, and an anchor 37 for the wire 34, anchoring it to a control lever 25 which is associated with a second control lever 38. The second lever is pivoted at its base about a shaft 39 which rests on bearings 40. Two compression springs 41 are disposed at respective ends underneath the plate 30. A support 42 is fixed underneath the middle of this plate, and a shoe plate 43 is welded to the bottom of the support. The shoe plate receives a synthetic-rubber type brake shoe 44 which is capable of being retracted into a chamber 45. A cam 46 is actuated by a link 47 which is itself driven by means of a shaft 48.

A square section bar 49 receives a locking element such as described above. Inside the fixed bar 49 there slides another bar 50, which may, for example, be the end of a stanchion 9. The locking element is received on a sleeve 51 which is fixed inside the bar 49 and includes a window 52.

Figures 7, 8:
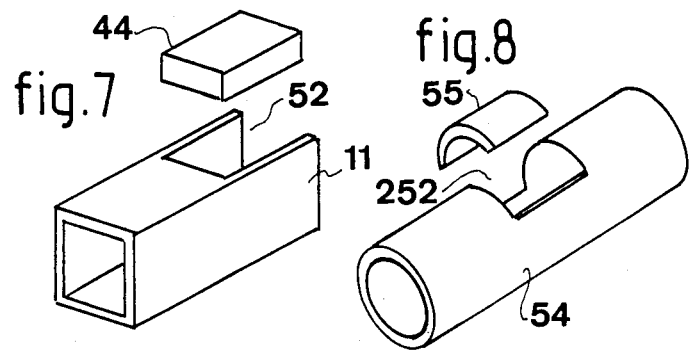
FIG. 7 is a diagrammatic perspective view of a square sleeve showing its window and its brake shoe fitted to its orifice.
FIG. 8 is a perspective diagrammatic view of a guide ring showing its window and its brake shoe fitted to its orifice.

The locking element may also be fitted to round bars. In this case, the guide ring (FIG. 8) includes a window 252 and a brake shoe 55 which is shaped like a portion of a cylinder. This disposition of the locking element 24 may be used, for example, at the end 26 of the telescopic strut.

In a second variant, a permanent locking device comprises four brake shoes 7 situated on the sliding bar 202 inside another, fixed bar 201. The mechanism is situated at substantially the same level as the four shoes 7, with the unlocking control being situated at the top end of the sliding tube.

This device comprises (FIGS. 9 to 12) a housing 56, four rectangular section seating tubes 57 in which the brake shoes 7 slide. Each shoe is driven inside its tube by a connecting rod 58 which is coupled by a pin to a recess 59 in a frusto-conical cam 60. A suspension spring 61 whose center is fixed in a guide 161 acts between the base 62 of the housing 56 and the base of the cam 60. When the spring is compressed to unlock the equipment, all four shoes are retracted into their tubes (FIGS. 11 and 12). Two washers 63 are disposed at the top of the conical cam 60 to provide a stop to limit the end of the stroke against the wall of the housing 56.

A piano wire type control rod 65 passes through the housing 56 and is received in the top of the cone. This rod passes through the backplate 66 and is engaged in a pushbutton 3 disposed in a box 67, with a spring 68 providing a return force to the pushbutton 3.

The radiographic apparatus also includes means for properly locating the X-ray plate relative to the X-ray source, in spite of the conditions under which the X-ray is being performed.

Depending on the chosen configuration, and as shown in FIG. 16, the tool for adjusting the parameters is a gauge including an infinite reflection mirror.

The adjusting tool comprises a stand 69 supporting a bracket 70 having a plate 71 at the top thereof which is surrounded by a protective frame 73 which receives a totally reflecting mirror 74.

An index 75 for locating the anatomical center is disposed underneath the plate 71. The stand 69 is suitable for sliding along a ruler 76 which includes index marks 169 for identifying the cassette format. A horizontal level may be provided between the stand 69 and the base of a T-shaped pedestal 176. A cassette-clamping jaw 77 is controlled by means of two levers 78, with clamping being provided by excentric means (not shown in the figures).

FIG. 17 shows the means for positioning a cassette 80 in three dimensions and for putting it in association with an X-ray source including a short arm 81. This arm supports a sheath enclosing an X-ray tube 82 and an anode 83 for emitting ionizing radiation. Height is determined by means of an index mark 179 sliding in a tube 79, with the patient 86 being interposed between the cassette 80 and the X-ray outlet 88.

A collimation system 84 using a light centering means with cross wires 89 centered relative to a rim 85 is known and is not described in more detail here. However, it is specified that the image of the center 87 of the cross wires 89 as returned by means of the mirror 74 can be used to obtain exact parallelism between the cassette and the radiation source. FIG. 18 is a diagrammatic view showing the various positions of a cassette depending on which of three different formats x, y, z are used.

The above-described elements are stored, decontaminated and sterilized in a caisson. Each of the faces of the caisson comprises framework 90 which includes slides 92. The wall 195 is fixed on two stanchions 94 which are fixed to the slides 92 and to a longitudinal bar 93 interconnecting opposite slides 92. The framework 90 (FIG. 21) includes orifices 91 which serve to receive interchangeable elements, e.g. from on top. In the bottom portion, the orifices 91 serve, for example, to receive a set of wheel - legs 97, the set of wheel - legs being advantageously constituted by two risers identical to the risers of the post described with reference to FIG. 3, comprising a bar, four brake shoes, a guide plate, a pushbutton for declutching the internal mechanism, and wheels 98 associated with the risers.

A basket of rigid stainless rods 99 is used for decontamination by jets of germicide or fungicide detergent, or by exposure to ultraviolet germicide rays. The basket includes a main handle 100 and four side handles 101 disposed near the bottom of the basket below its center of gravity to enable it to be extracted via any of the sides.

A hinged plate 102 is disposed at the base of the basket and a second identical plate is placed above the basket to serve as a lid. A two-part plate 107 having cutaway angles is received on the bottom 106 of the caisson and serves to receive the basket 99 and to enable it to be removed easily via any of the sides. A "toast-rack" arrangement 103 is provided for decontaminating X-ray cassettes. For example, as shown in FIG. 22, a raised cassette 104 relative to the base 105 enables a vaporized material to be diffused over all the surfaces that need contaminating. The caisson may also comprise panels of transparent material depending on its purpose and the direction of the vertically disposed slides.

The caisson is constituted by six panels suitable for being slid along the slides on each face of the framework. These panels allow access to the caisson through any of its faces.

Other elements may be disposed on top of the caisson depending on its intended purpose.

Figure 23:
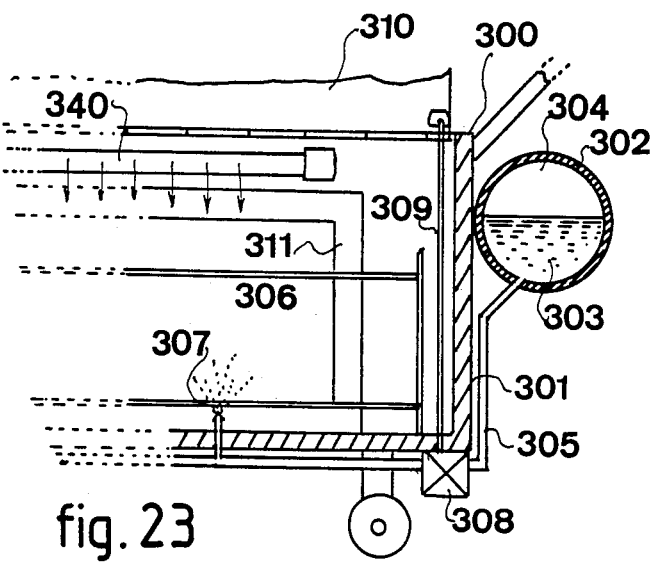
FIG. 23 is a section through a portion pof a caisson including decontamination means.

FIG. 23 is a partial section through the decontamination caisson. More precisely, in an advantageous embodiment, this caisson 300 includes, e.g. on a side 301, a volume on tank 302 suitable for containing a fluid 303 which may be a gas or a liquid. In this illustrated embodiment, the fluid 303 is a liquid which is pressurized by means of a gas, e.g. an inert gas 304 situated above the liquid 303. The volume 302 is connected via a duct 305 to the inside chamber 306 of the caisson 300, with the duct 305 opening out to the inside chamber 306 of the caisson via a spray injector 307.

Advantageously, closure means on valve 308 are connected in series in the duct 305 under the control of a control rod 309 suitable for being moved by the lid 310 of the caisson. But, when the caisson is closed the closure means 308 allows the fluid under pressure 303 to communicate with the injector 307 so that a portion of this liquid is injected and sprayed inside the chamber 306 under the action of the compressed gas 304, thereby decontaminating objects located inside the caisson, for example an X-ray plate shown diagrammatically at 311.

Figure 24:
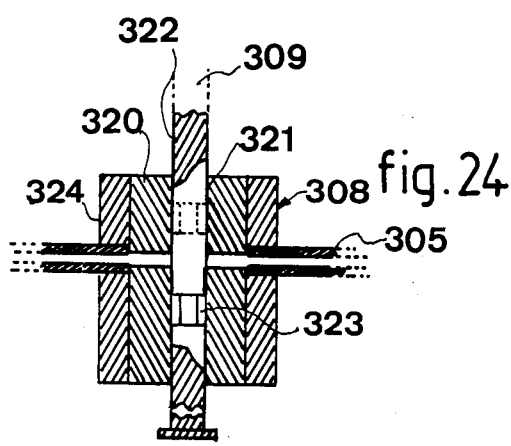
FIG. 24 is a section view through an element of the decontamination means shown in FIG. 23.

FIG. 24 shows one embodiment of such controllable closure means on valve 308, which is constituted, for example, by a body 320 having an orifice 321 within which a piston 322 is mounted to slide under the control of the rod 309. The piston 322 may include a circular groove 323, for example. This piston 322 under the control of the rod 309 which is coupled to the lid 310 can thus move in translation in such a manner that depending on whether the lid is open or closed, the groove 323 is located inside the body 320 level with the inside 324 of the duct 305 thereby enabling the inside of the volume 302 to be put into communication with the inside chamber 306 of the caisson 300. Then, under the action of the pressure exerted by the gas 304, a certain quantity of liquid 303 is sprayed inside the enclosure 306.

Naturally, this embodiment has been given solely by way of example and it is obvious that means other than closure means 308 could be used to enable measured or non-measured quantities to be passed as a function of the length of time that the caisson is left open or of any other parameter, and as a function of the various applications intended for the apparatus.

Likewise, although decontamination using a liquid has been shown, gaseous decontamination fluids could also be used, as could light such as the light supplied by an ultraviolet lamp 340 disposed against one of the side walls of the caisson and suitable for being turned on, for example, when the lid 310 of the caisson is closed. Ultraviolet radiation destroys some bacteria which may develop after an X-ray plate has been put into contact, for example, with a patient infected with such bacteria.

The caisson is used to decontaminate the equipment by placing the above-mentioned component parts in one basket. the cassettes are put into another basket and are held in position by a "toastrack" to enable decontamination products to be sprayed between them, e.g. a detergent from the super-activated aldehyde group. The caisson may itself be sterilized in an autoclave using the same technique as is used for surgical instruments. Accessory equipment such as the wheels, the struts and the T-shaped part may be placed in one of the baskets.

I claim:

1. A movable apparatus for use with an x-ray device comprising a source of X-ray radiation, a reference surface and at least one X-ray cassette whereby the X-ray cassette is subjected to radiography in any location with complete aseptic safety, said movable apparatus comprising:
   a tripod, said tripod comprising a plurality of assembled first unit elements and means for locking said unit elements relative to one another to form an assembled tripod;
   means for fixing an X-ray cassette on said tripod;
   means for positioning said tripod over a reference surface and in a given orientation;
   a caisson comprising second interfitting elements, said caisson having an inside volume enclosing said tripod; and
   controllable means for decontaminating the interior of said caisson.

2. Apparatus according to claim 1, wherein said tripod further includes aiming means for causing optically centering of a source of X-ray radiation.

3. Apparatus according to claim 1, wherein said assembled first unit elements and said means for fixing an X-ray cassette on said tripod comprises a main structure situated substantially in a first plane, a longitudinal housing, a post sliding in said main structure in said longitudinal housing, a cassette-positioning frame, said frame being fixed to said post in a second plane at a non-zero angle with the first plane, and pointable means for holding an X-ray cassette on one of said main structure and said frame.

4. Apparatus according to claim 3, wherein said tripod includes a secondary structure, at least one riser fixed to said secondary structure and sliding in said housing in said main structure, and means for locking said riser relative to said main structure.

5. Apparatus according to claim 4, wherein said tripod includes at least one T-shaped base, means for pointing said at least one base relative to said secondary structure, and means for locking said at least one base relative to said secondary structure.

6. Apparatus according to claim 1, wherein said caisson comprises at least one framework, a plate forming the bottom of said caisson, a lid, panels forming the sides of said caisson, and slide means on said framework mounting said plate, said lid and said panels in such a manner as to surround said framework.

7. Apparatus according to claim 1, wherein said caisson includes wheel means, said wheel means including at least one wheel pivotally mounted on at least one riser sliding in an orifice of said framework.

8. Apparatus according to claim 1, wherein said controllable decontaminating means comprises at least one tank for containing a decontamination fluid, means coupled to said tank for injecting a determined quantity of decontamination fluid into the interior of said caisson and means for controlling injection of the contamination fluid.

9. Apparatus according to claim 8, wherein said means for injecting the fluid into the interior of said caisson comprise a duct connecting said tank to the interior of said caisson, said duct opening out into the interior of said caisson via an injector, and wherein said means for controlling the injection of the fluid comprises a valve in series in said duct, and means for controlling the opening of said valve.

10. Apparatus according to claim 1, wherein said caisson comprises at least one framework, a plate for the bottom of said caisson, a lid, panels for the sides of said caisson, slide means for mounting said lid, said plate and said panels in such a manner as to surround said framework, said controllable decontamination means comprise at least one tank for containing a decontamination fluid, means coupled to said tank for injecting a determined quantity of the decontamination fluid into the interior of said caisson, said means for injecting decontamination fluid into the interior of said caisson comprise a duct connecting said tank to the interior of said caisson, said duct opening out into the interior of said caisson via an injector, a valve in series in said duct, and wherein said means for injecting decontamination fluid comprises means for controlling the opening of said valve and coupling means between said lid of said caisson and said valve so as to open said valve for a given duration when said lid is closed.

11. Apparatus according to claim 1, wherein said decontamination means comprise a source of a radiation having a decontamination power, said radiation source being disposed inside said caisson, and means for releasing radiation at determined instants.

* * * * *